United States Patent
O'Sullivan

(10) Patent No.: US 10,074,965 B2
(45) Date of Patent: Sep. 11, 2018

(54) COVER ASSEMBLIES FOR CABLES AND ELECTRICAL CONNECTIONS AND METHODS FOR MAKING AND USING THE SAME

(71) Applicant: Tyco Electronics Corporation, Berwyn, PA (US)

(72) Inventor: Edward O'Sullivan, Cary, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 181 days.

(21) Appl. No.: 15/142,759

(22) Filed: Apr. 29, 2016

(65) Prior Publication Data
US 2017/0317481 A1    Nov. 2, 2017

(51) Int. Cl.
| H01R 43/00 | (2006.01) |
| H02G 3/04 | (2006.01) |
| H02G 1/14 | (2006.01) |

(52) U.S. Cl.
CPC .............. *H02G 3/0462* (2013.01); *H02G 1/14* (2013.01); *H02G 3/0437* (2013.01); *Y10T 29/49194* (2015.01)

(58) Field of Classification Search
CPC ......... Y10T 29/49208; Y10T 29/49194; Y10T 403/11; H01R 43/00; H02G 1/14; H02G 3/0462
USPC .......... 29/869, 428, 717, 729, 752, 795, 873
See application file for complete search history.

(56) References Cited

U.S. PATENT DOCUMENTS

| 3,163,707 A | 12/1964 | Darling |
| 3,475,719 A | 10/1969 | Akin et al. |
| 3,689,114 A | 9/1972 | Meserole |
| 4,601,529 A | 7/1986 | Billet |
| 5,233,363 A | 8/1993 | Yarsunas et al. |
| 5,286,220 A | 2/1994 | Watson |
| 5,315,063 A | 5/1994 | Auclair |
| 5,577,926 A | 11/1996 | Cox |
| 5,740,583 A | 4/1998 | Shimada et al. |
| 5,844,170 A | 12/1998 | Chor et al. |

(Continued)

OTHER PUBLICATIONS

U.S. Appl. No. 15/136,445, filed Apr. 22, 2016, Chuang.

(Continued)

*Primary Examiner* — Thiem Phan
(74) *Attorney, Agent, or Firm* — Myers Bigel, P.A.

(57) ABSTRACT

An integral, unitary cover assembly for covering an electrical connection between first and second electrical cables each having a primary conductor and a neutral conductor, includes an elastomeric inner sleeve, an elastomeric outer sleeve surrounding the inner sleeve, and a collapsible duct assembly interposed radially between the inner and outer sleeves. The inner sleeve defines a cable passage to receive the electrical connection and the primary conductors of the first and second cables. The duct assembly includes an outer duct sleeve member defining a first passage and an inner retention member disposed in the first passage. The retention member maintains the duct sleeve member in an open configuration when the retention member is disposed in the first passage. The duct sleeve member is selectively collapsible about the at least one neutral conductor from the open configuration to a collapsed configuration by withdrawing the retention member from the first passage.

20 Claims, 14 Drawing Sheets

(56) References Cited

U.S. PATENT DOCUMENTS

| | | | |
|---|---|---|---|
| 6,364,677 B1 | 4/2002 | Nysveen et al. | |
| 7,182,617 B1 | 2/2007 | Cairns et al. | |
| 7,264,494 B2 | 9/2007 | Kennedy et al. | |
| 7,476,114 B1 | 1/2009 | Contreras | |
| 7,728,227 B2 | 6/2010 | Portas et al. | |
| 7,858,883 B2 | 12/2010 | Seraj et al. | |
| 8,030,570 B2 | 10/2011 | Seraj et al. | |
| 8,205,911 B2 | 6/2012 | Cordes et al. | |
| 9,184,576 B2 * | 11/2015 | Vallauri | H02G 15/1826 |
| 9,202,612 B2 | 12/2015 | Hernandez et al. | |
| 9,224,519 B2 * | 12/2015 | McLaughlin | H02G 15/1826 |
| 9,224,522 B2 | 12/2015 | Yaworski et al. | |
| 9,960,576 B2 | 5/2018 | Chuang | |
| 2005/0269124 A1 | 12/2005 | Suzuki et al. | |
| 2007/0293087 A1 | 12/2007 | Kennedy et al. | |
| 2008/0143097 A1 | 6/2008 | Canale | |
| 2009/0181583 A1 | 7/2009 | Krabs | |
| 2010/0012350 A1 | 1/2010 | Hardi et al. | |
| 2010/0279542 A1 | 11/2010 | Seraj et al. | |
| 2017/0310093 A1 | 10/2017 | Chuang | |

OTHER PUBLICATIONS

"CSJA In-line Cold Shrinkable Joints for 1/C Shielded Power Cables (15-35kV)" Tyco Electronics, 2006/2007, 2 pages.

"CSJA Cold Shrinkable 'All-In-One' Straight Joint for Polymeric Insulated Cables Up to 42 kV" Tyco Electronics EPP 1348, Jul. 2007, 4 pages.

\* cited by examiner

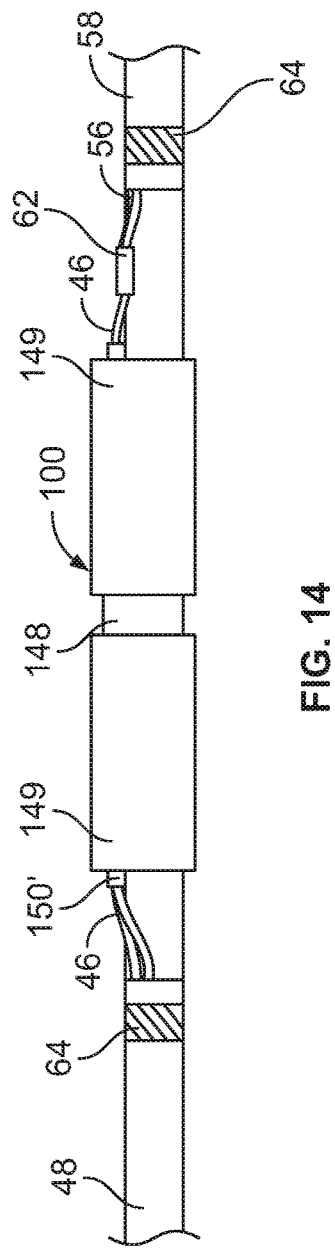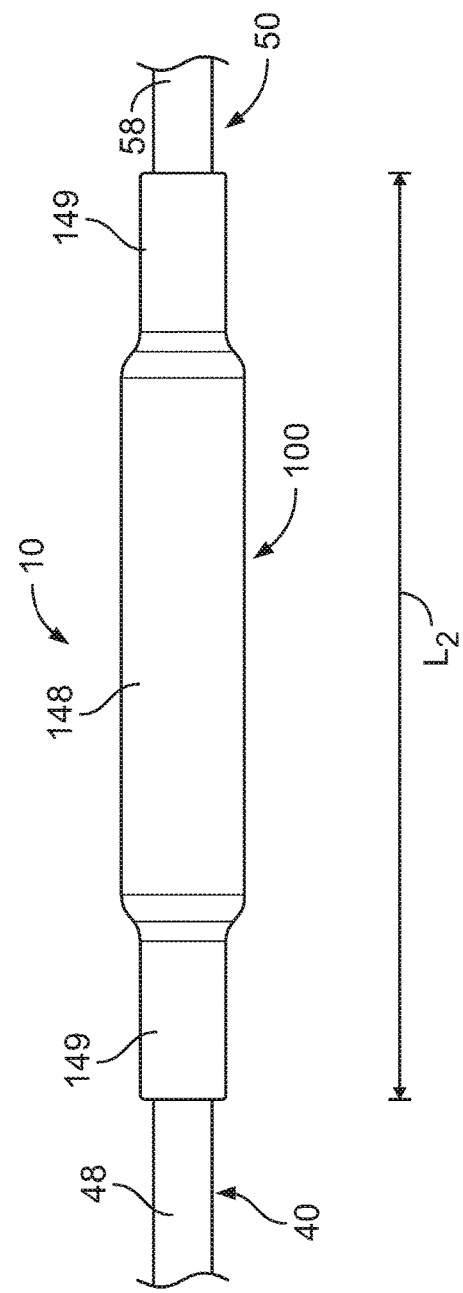

COVER ASSEMBLIES FOR CABLES AND ELECTRICAL CONNECTIONS AND METHODS FOR MAKING AND USING THE SAME

FIELD OF THE INVENTION

The present invention relates to electrical cables and connections and, more particularly, to protective covers for electrical cables and electrical connections.

BACKGROUND OF THE INVENTION

Cold shrinkable covers are commonly employed to protect or shield electrical power cables and connections (e.g., low voltage cables up to about 1000 V and medium voltage cables up to about 46 kV). One application for such covers is for splice connections between concentric neutral cables. A concentric neutral cable typically includes at least one primary conductor surrounded by a polymeric insulation layer, a conductive layer, one or more neutral conductors surrounding the conductive layer, and a polymeric jacket surrounding the neutral conductors. Examples of cold shrinkable covers for use with concentric neutral cables include the "All-in-One" CSJA Cold Shrinkable joint, available from Tyco Electronics Corporation of Fuquay-Varina, N.C., which includes an integral neutral conductor mesh. It is also known to cover splices between concentric neutral cables using a cold shrink elastomeric cover tube (such as the CSJ product, available from Tyco Electronics Corporation) in combination with a separate re-jacketing cover (such as the GELWRAP™ product, available from Tyco Electronics Corporation). In this case, the cold shrink tube is installed over the primary conductors and the insulation layers, the neutral conductors are laid over the cold shrink tube, and the re-jacketing cover is subsequently wrapped around the neutral conductors and the insulation layer. Each of these known methods may suffer from problems or limitations in performance and/or installation.

SUMMARY OF THE INVENTION

According to embodiments of the invention, an integral, unitary cover assembly for covering an electrical connection between first and second electrical cables each having a primary conductor and a neutral conductor, includes an elastomeric inner sleeve, an elastomeric outer sleeve surrounding the inner sleeve, and a collapsible duct assembly interposed radially between the inner and outer sleeves. The inner sleeve defines a cable passage to receive the electrical connection and the primary conductors of the first and second cables. The duct assembly includes an outer duct sleeve member defining a first passage and an inner retention member disposed in the first passage. The retention member defines a second passage configured to receive at least one of the neutral conductors therethrough. The duct sleeve member is flexible. The retention member maintains the duct sleeve member in an open configuration when the retention member is disposed in the first passage. The duct sleeve member is selectively collapsible about the at least one neutral conductor from the open configuration to a collapsed configuration by withdrawing the retention member from the first passage.

According to method embodiments of the invention, a method for forming a connection assembly includes: forming an electrical connection between first and second electrical cables, the first and second cables each including a primary conductor and at least one neutral conductor; and providing an integral, unitary cover assembly. The cover assembly includes an elastomeric inner sleeve, an elastomeric outer sleeve surrounding the inner sleeve, and a collapsible duct assembly interposed radially between the inner and outer sleeves. The inner sleeve defines a cable passage to receive the electrical connection and the primary conductors of the first and second cables. The duct assembly includes an outer duct sleeve member defining a first passage and an inner retention member disposed in the first passage. The retention member defines a second passage configured to receive at least one of the neutral conductors therethrough. The duct sleeve member is flexible. The retention member maintains the duct sleeve member in an open configuration when the retention member is disposed in the first passage. The duct sleeve member is selectively collapsible about the at least one neutral conductor from the open configuration to a collapsed configuration by withdrawing the retention member from the first passage. The method further includes: mounting the cover assembly on the cables such that the electrical connection and the primary conductors of the first and second cables extend through the cable passage; with the duct sleeve member in the open configuration, inserting the at least one neutral conductor of the first cable through the second passage of the retention member; with the at least one neutral conductor disposed in the second passage, withdrawing the retention member from the first passage to collapse the duct sleeve member from the open position to the collapsed position; and coupling the at least one neutral conductor of the first cable with the at least one neutral conductor of the second cable.

According to method embodiments of the invention, a method for forming an integral, unitary cover assembly for covering an electrical connection between first and second electrical cables each having a primary conductor and a neutral conductor, includes: forming an inner elastomeric sleeve defining a cable passage to receive the electrical connection and the primary conductors of the first and second cables; forming an outer elastomeric sleeve surrounding the inner sleeve; and interposing a collapsible duct assembly radially between the inner and outer sleeves. The duct assembly includes an outer duct sleeve member defining a first passage and an inner retention member disposed in the first passage. The retention member defines a second passage configured to receive at least one of the neutral conductors therethrough. The duct sleeve member is flexible. The retention member maintains the duct sleeve member in an open configuration when the retention member is disposed in the first passage. The duct sleeve member is selectively collapsible about the at least one neutral conductor from the open configuration to a collapsed configuration by withdrawing the retention member from the first passage.

According to embodiments of the invention, a connection assembly includes: first and second electrical cables each including a primary conductor and at least one neutral conductor; a connector coupling the primary conductors of the first and second cables to form an electrical connection; and an integral, unitary cover assembly. The cover assembly includes an elastomeric inner sleeve, an elastomeric outer sleeve surrounding the inner sleeve, and a collapsible duct assembly interposed radially between the inner and outer sleeves. The inner sleeve defines a cable passage to receive the electrical connection and the primary conductors of the first and second cables. The duct assembly includes an outer duct sleeve member defining a first passage and an inner retention member disposed in the first passage. The retention member defines a second passage configured to receive at least one of the neutral conductors therethrough. The duct sleeve member is flexible. The retention member maintains the duct sleeve member in an open configuration when the retention member is disposed in the first passage. The duct sleeve member is selectively collapsible about the at least one neutral conductor from the open configuration to a collapsed configuration by withdrawing the retention member from the first passage. The electrical connection and the primary conductors of the first and second cables extend through the cable passage and the at least one neutral conductor of the first cable extends through the first passage of the retention member and is coupled to the at least one neutral conductor of the second cable.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 12-15 are side views illustrating procedures for installing the cover assembly of FIG. 1 on a pair of concentric neutral cables coupled by a connector.

DETAILED DESCRIPTION OF EMBODIMENTS OF THE INVENTION

Figure 1:
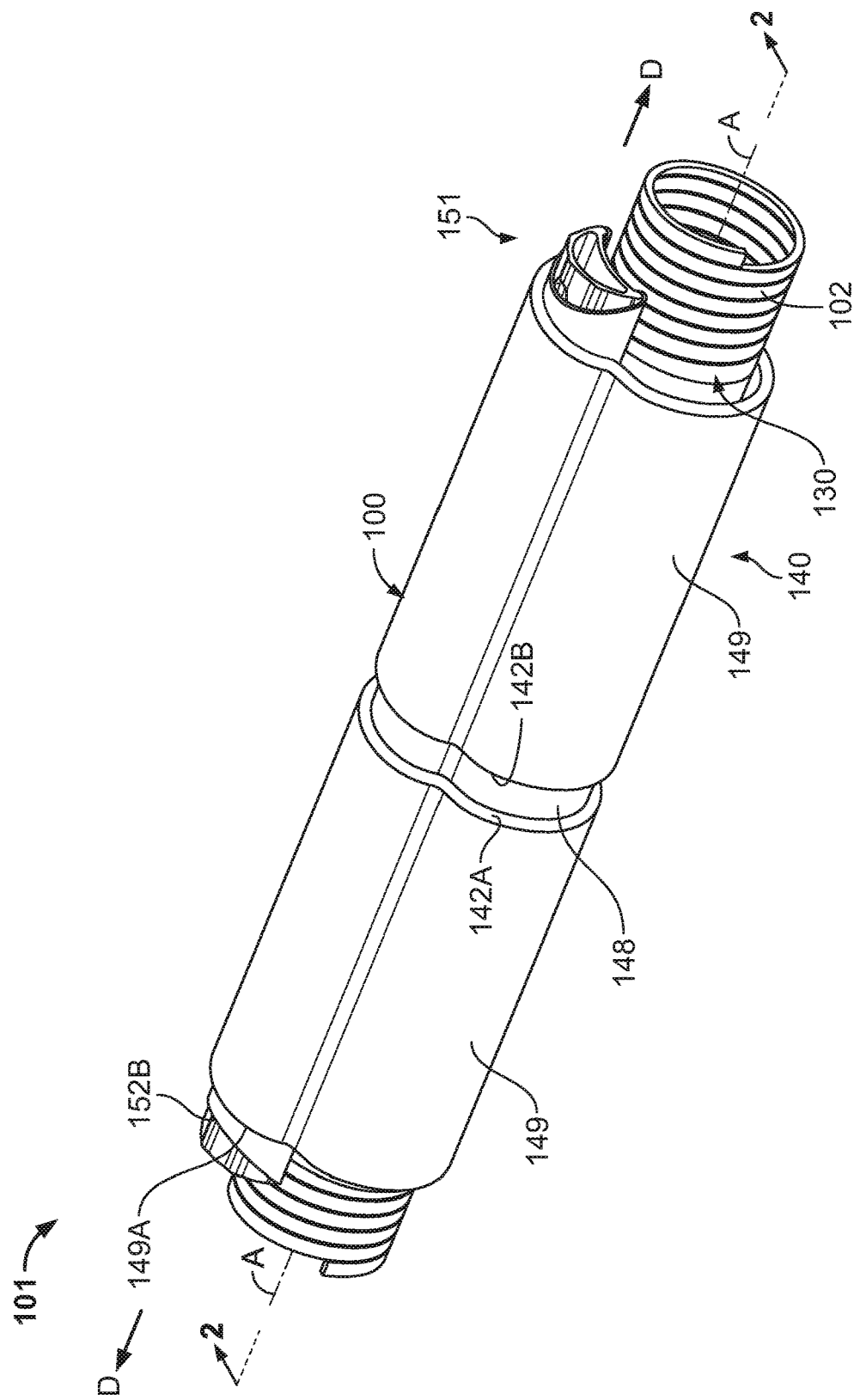
FIG. 1 is a perspective view of a pre-expanded unit including a cover assembly and a holdout device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
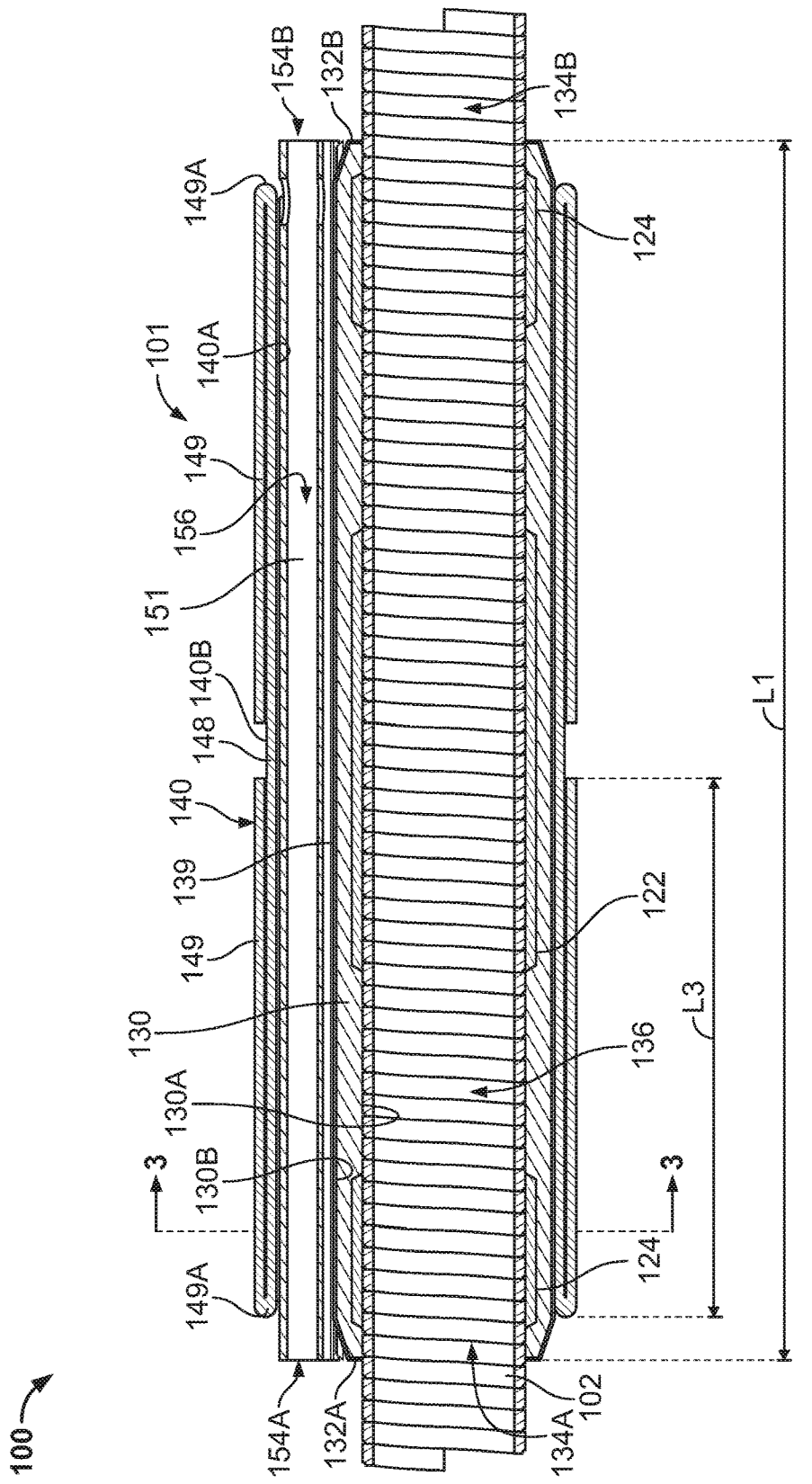
FIG. 2 is a cross-sectional view of the pre-expanded unit of FIG. 1 taken along the line 2-2 of FIG. 1.
Figure 3:
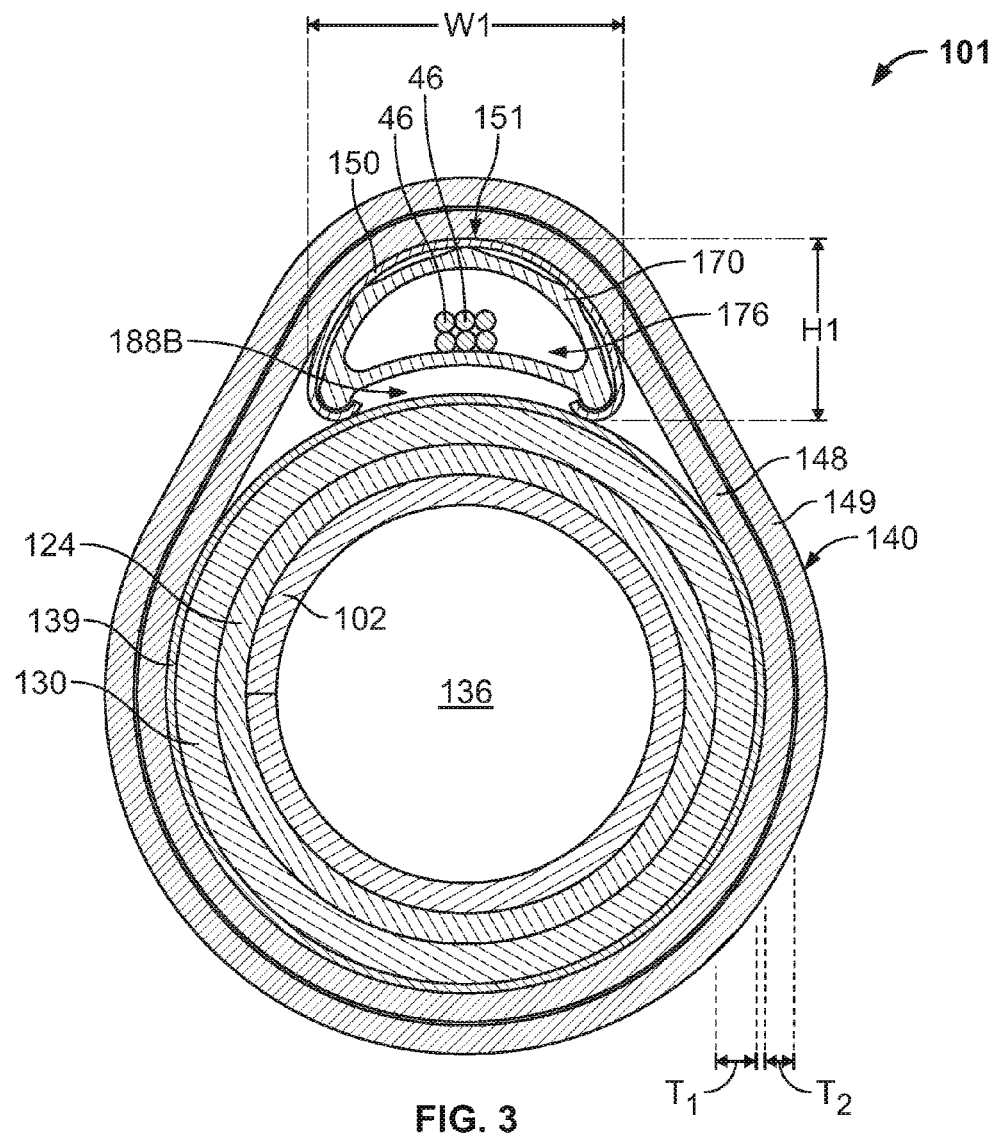
FIG. 3 is a cross-sectional view of the pre-expanded unit of FIG. 1 taken along the line 3-3 of FIG. 2, wherein a duct assembly forming a part of the pre-expanded unit is in an open configuration.
Figure 16:
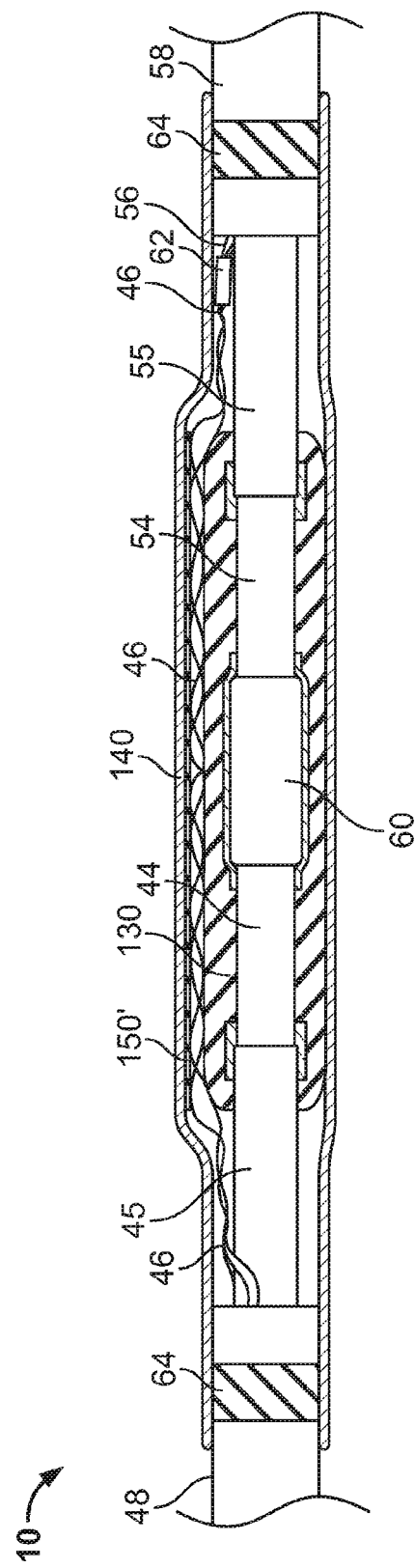
FIG. 16 is a cross-sectional view of the covered splice connection of FIG. 15.

With reference to FIGS. 1-10, a cover assembly 100 according to some embodiments of the present invention is shown therein. The cover assembly 100 includes a Faraday cage layer 122, stress cone layers 124, an inner sleeve (or insulation body) 130, a semiconductor layer 139, an outer sleeve (or re-jacket) 140, and a duct assembly or device 151, as discussed in more detail below. The cover assembly 100 may be used to cover and electrically insulate electrical substrates such as cables and connectors. The cover assembly 100 may be provided as a pre-expanded unit 101 including a holdout device 102, as shown in FIGS. 1-3, wherein the cover assembly 100 is in an expanded state or position. The cover assembly 100 may be deployed and mounted on the intended substrate in a retracted state or position as shown in FIGS. 15 and 16 and discussed in more detail below. According to some embodiments, the cover assembly 100 is a cold shrink cover, meaning that it can be shrunk or retracted about the substrate without requiring the use of applied heat.

The cover assembly 100 may be used to cover and seal a connection or splice between two or more cables 40, 50 including a connector 60 to form a connection assembly 10 as shown in FIGS. 15 and 16. According to some embodiments, the cables 40, 50 are concentric neutral cables.

Referring to FIGS. 1-3, the cover assembly 100 has a lengthwise axis A-A. The Faraday cage layer 122, the stress cone layers 124, the inner sleeve 130, the semiconductor layer 139, the outer sleeve 140, and the duct assembly 151 are provided as an integral, unitary structure extending lengthwise along the axis A-A. According to some embodiments, the cover assembly 100 is provided pre-installed and pre-expanded on the holdout 102.

The inner sleeve 130 has opposed inner and outer surfaces 130A and 130B, and opposed ends 132A, 132B. The inner sleeve 130 is tubular and defines an axially extending conductor through passage 136 that communicates with opposed end openings 134A, 134B.

The Faraday cage layer 122 is illustrated as a generally tubular sleeve bonded to the inner surface 120 of the inner sleeve 130. The Faraday cage layer 122 may be formed of a suitable elastically conductive elastomer. In use, the Faraday cage layer 122 may form a Faraday cage to provide an equal potential volume about the connector 60 so that an electric field is cancelled in the surrounding air voids.

The stress cone layers 124 are illustrated as generally tubular sleeves bonded to the inner surface 130A of the inner sleeve 130 at either end 132A, 132B thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

According to some embodiments, the layers 122, 124 are formed of a material having a Modulus at 100 percent elongation (M100) in the range of from about 0.68 to 0.88 MPa.

The semiconductor layer 139 fully circumferentially surrounds the inner sleeve 130. According to some embodiments, the semiconductor layer 139 is coextensive with the inner sleeve 130.

The outer sleeve 140 has opposed inner and outer surfaces 140A and 140B, and opposed ends 142A, 142B. The inner sleeve 140 is tubular and defines an axially extending conductor through passage that communicates with opposed end openings 144A, 144B. When mounted on the holdout 102 as shown in FIGS. 1-3, outer sections 149 of the outer sleeve 140 are folded back on an intermediate section 148 of the outer sleeve 140 at annular folds 149A.

Figure 4:
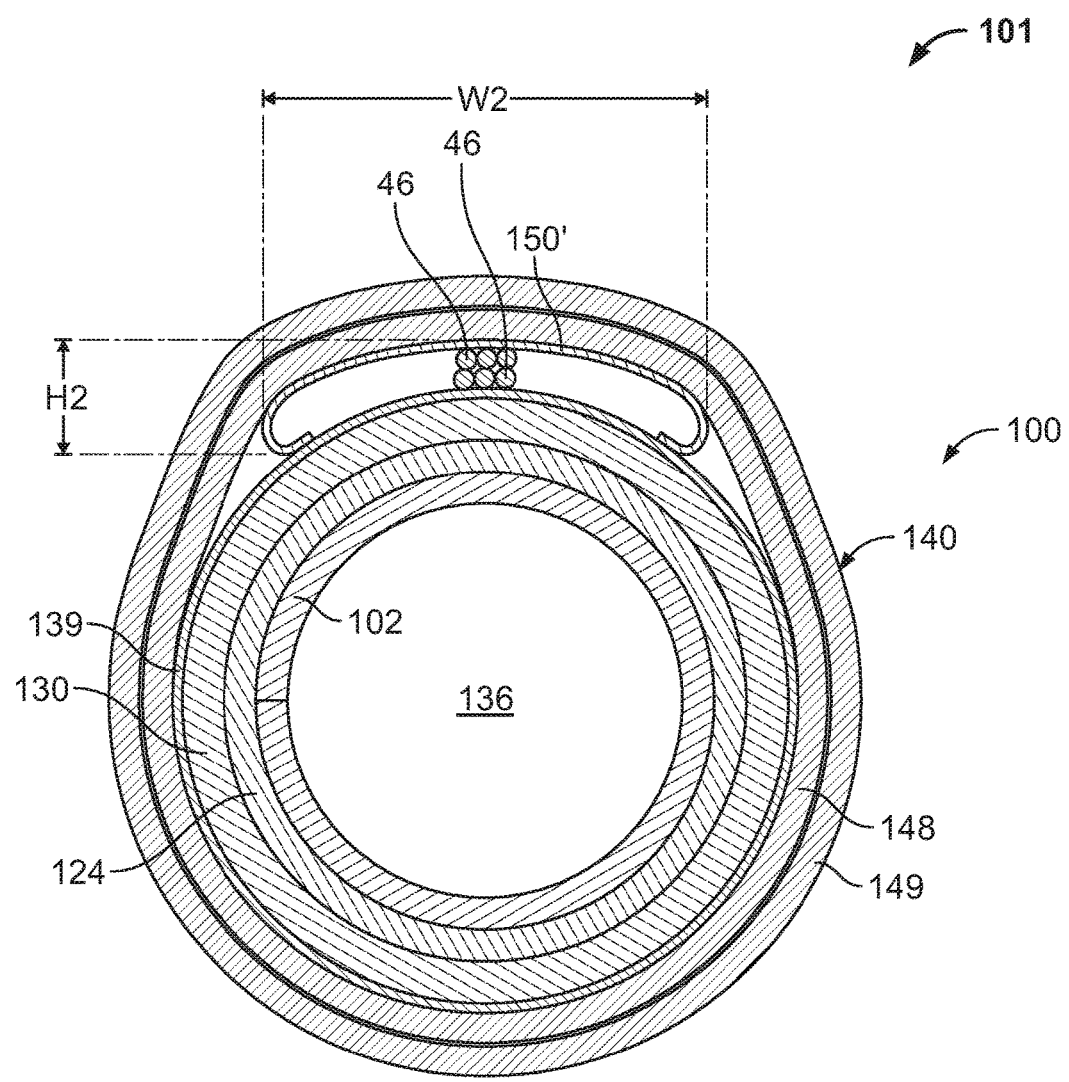
FIG. 4 is a cross-sectional view of the pre-expanded unit of FIG. 1 taken along the line 3-3, wherein the duct assembly is in a collapsed configuration.
Figure 5:
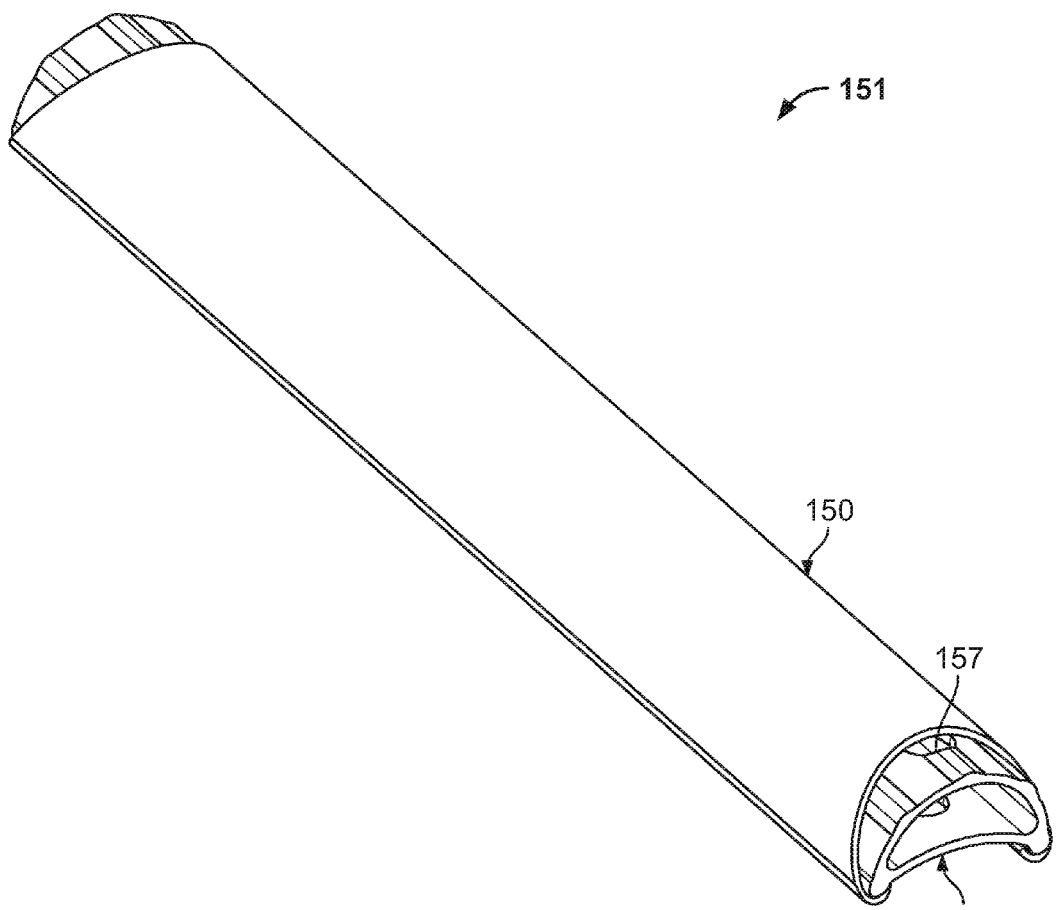
FIG. 5 is a top perspective view of the duct assembly of FIG. 4 in the open configuration.
Figure 6:
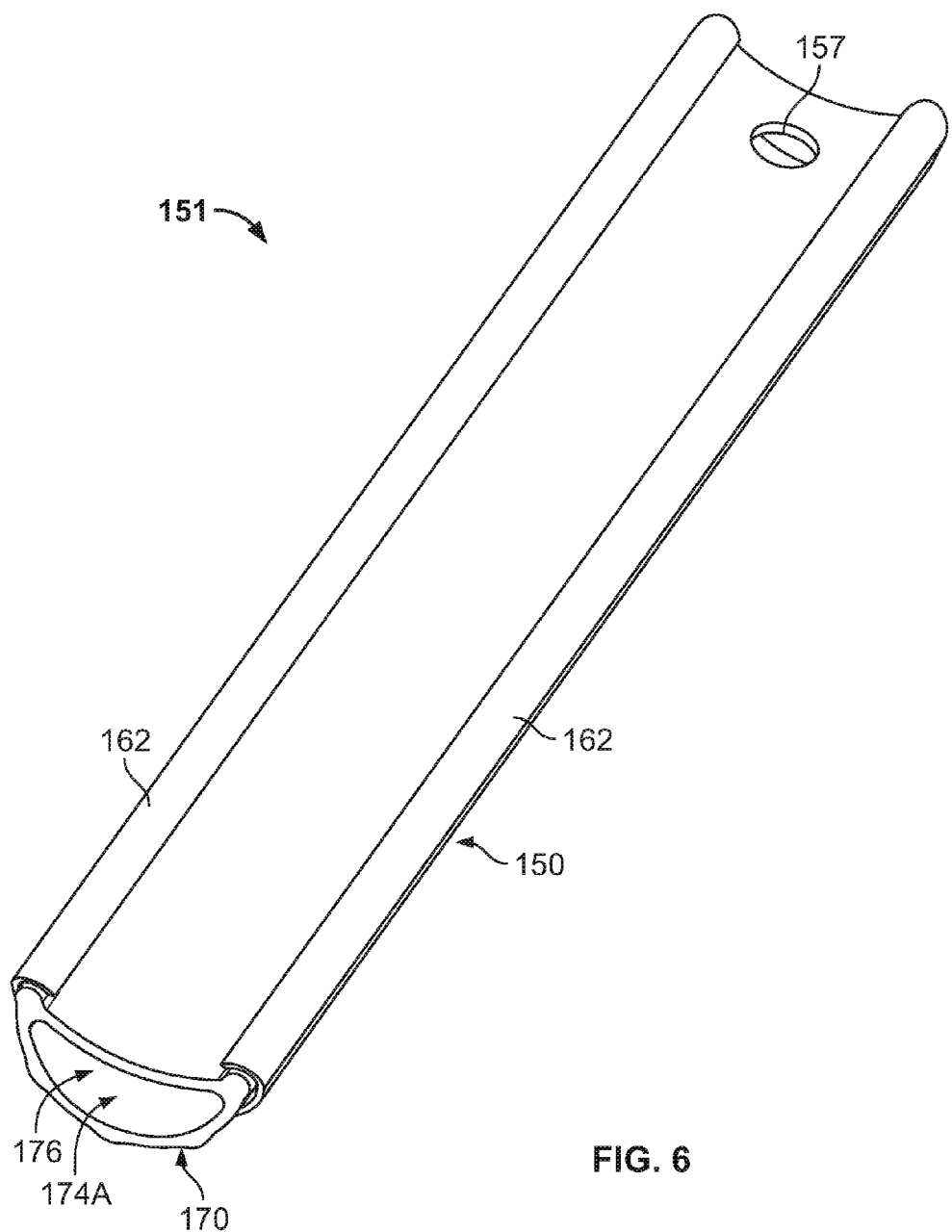
FIG. 6 is a bottom perspective view of the duct assembly of FIG. 4 in the open configuration.
Figure 7:
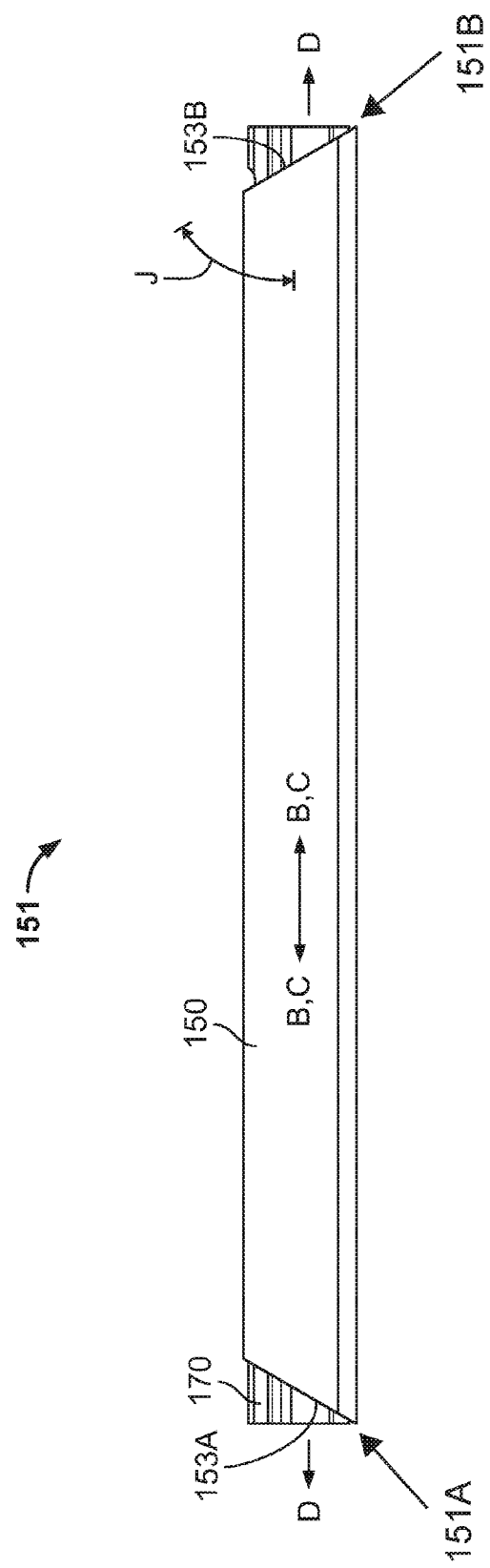
FIG. 7 is a side view of the duct assembly of FIG. 4 in the open configuration.
Figure 8:
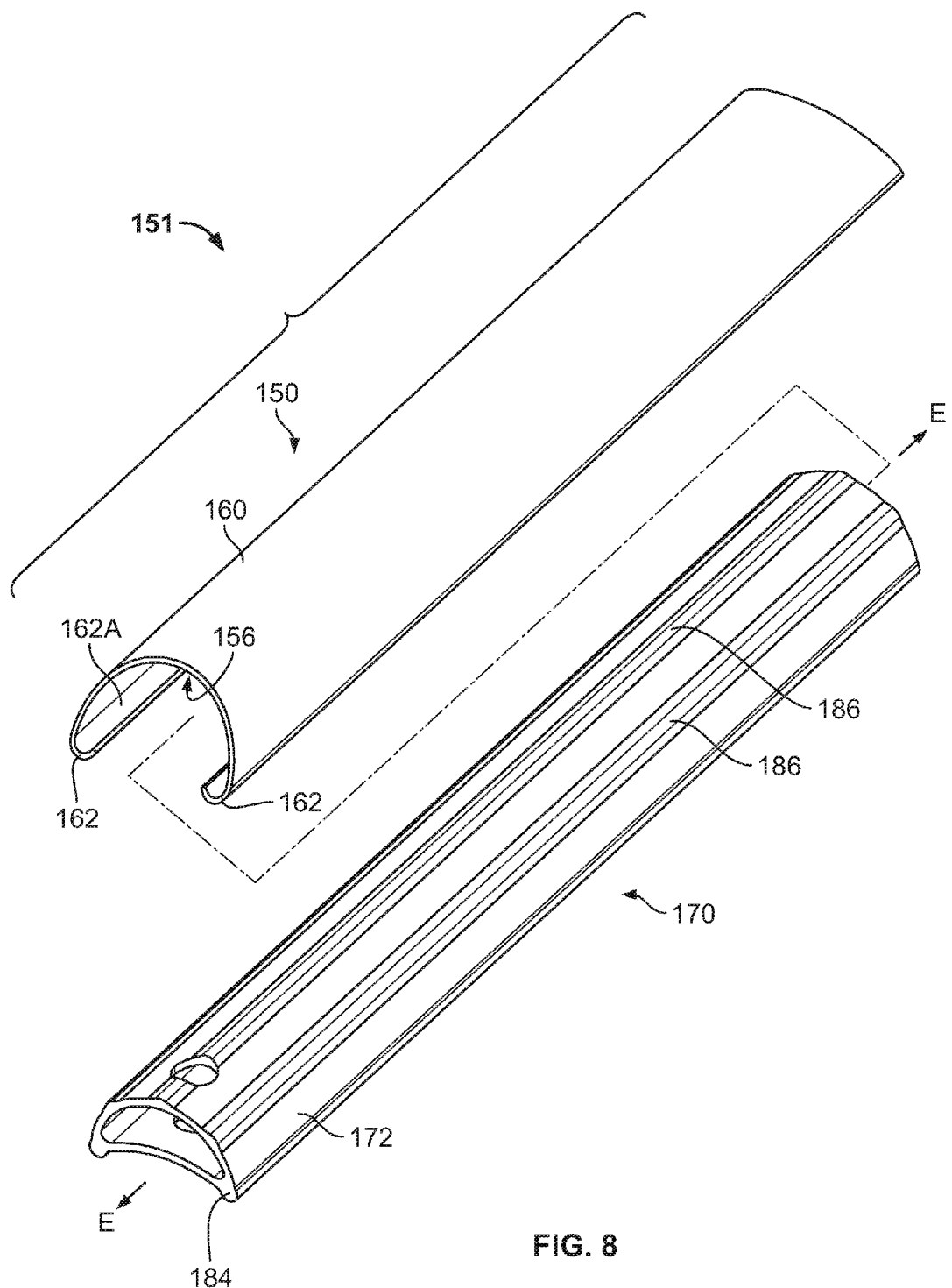
FIG. 8 is a top exploded, perspective view of the duct assembly of FIG. 4.
Figure 9:
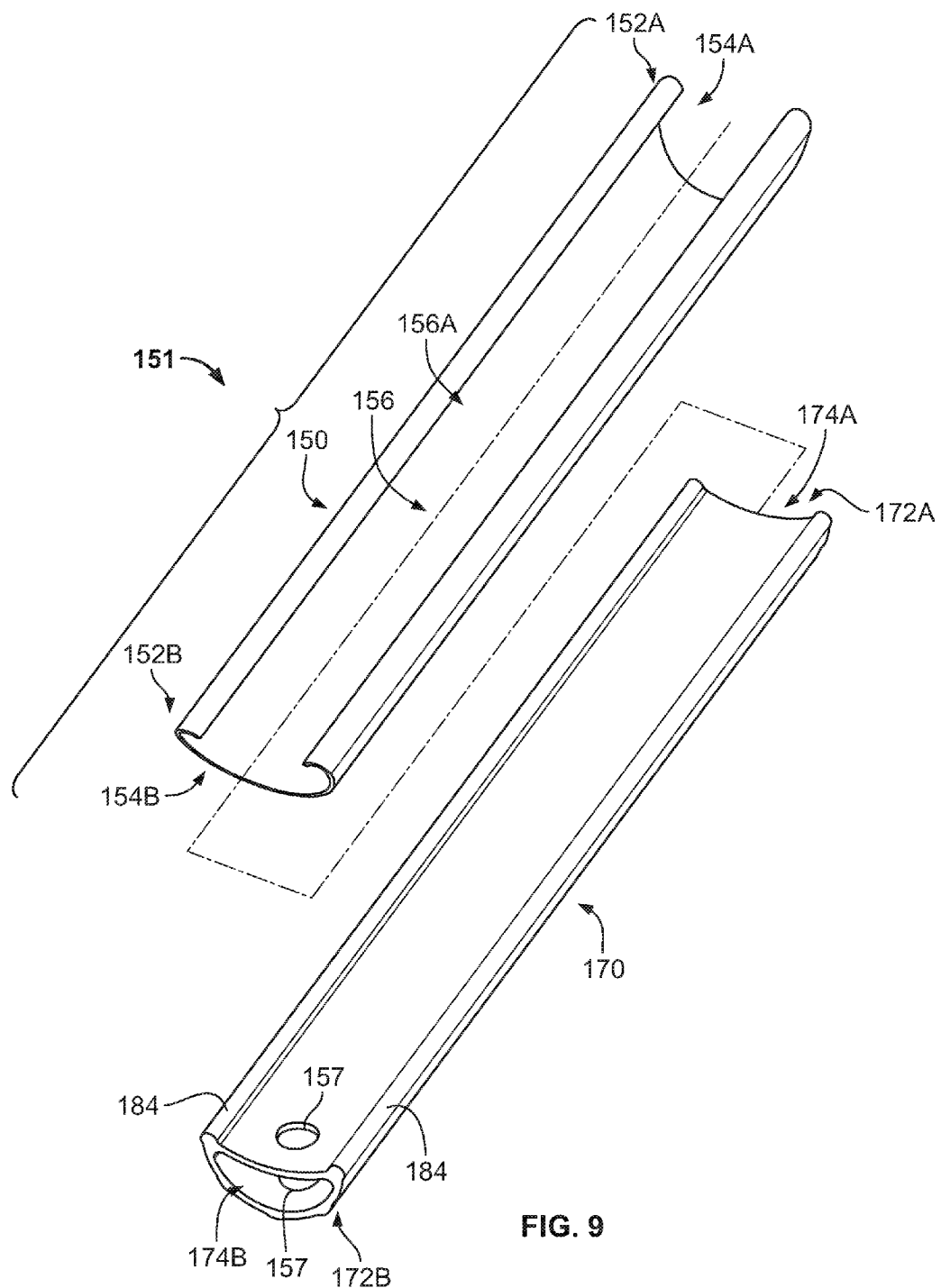
FIG. 9 is a bottom exploded, perspective view of the duct assembly of FIG. 4.

The duct assembly 151 is a tubular assembly including a duct outer member or duct sleeve member 150 and a duct inner member or retention member 170. The duct assembly 151 has opposed ends 151A, 151B and a lengthwise axis D-D extending substantially parallel to the cover assembly axis A-A. The sleeve member 150 is a flexible, generally C-shaped element and the retention member 170 is a tubular, rigid or semi-rigid element. When the duct assembly 151 is assembled, the retention member 170 provides the duct assembly 151 with structural support and rigidity such that the duct assembly 151 maintains the sleeve member 150 in an expanded, erected or open configuration as shown in FIGS. 1-3, 5-7 and 10. Upon removal of the retention member 170 from the sleeve member 150, the sleeve member 150 can bend, flatten or deform to assume a compressed or collapsed configuration as shown in FIGS. 4 and 16.

The sleeve member 150 is elongate and has opposed ends 152A, 152B and a lengthwise axis B-B extending substantially parallel to the lengthwise axis D-D of the duct assembly 151. The sleeve member 150 initially assumes an expanded, erected or open configuration as shown in FIGS. 1-3, 5-7 and 10 and, as discussed below, can be converted to a compressed or collapsed configuration as shown in FIGS. 4 and 16. The sleeve member 150 has an inner surface 158B and an outer surface 158A. The inner surface 158B defines an axially extending neutral conductor through passage 156 terminating at and communicating with opposed and openings 154A, 154B. A longitudinally extending opening or slot 156A is defined in the sleeve member 150 and intersects and communicates with each of the passage 156 and the end openings 154A, 154B.

The sleeve member 150 includes a longitudinally extending outer, top wall section 160 and a pair of longitudinally extending integral retention flanges 162 located on opposed terminal edges of the top wall section 160. Each retention flange 162 is substantially C-shaped (in lateral cross-section perpendicular to the lengthwise axis D-D) and defines a longitudinally extending retention groove 162A. The profiles of the outer surfaces 162B of the lower edges of the sleeve member 150 are rounded. The terminal edges 162C of the sleeve member 150 are raised above (i.e. inwardly toward the top wall section 160) relative to the lowermost surfaces of the sleeve member 150.

The end edges 153A, 153B of the sleeve member 150 are disposed at an oblique angle J (FIG. 7) relative to the axis D-D. In some embodiments, the angle J is in the range of from about 30 to 90 degrees.

The retention member 170 has a lengthwise axis C-C extending substantially parallel to the sleeve member access B-B. The retention member 170 includes a tubular, elongate body 172. The retention member 170 has opposed ends 172A, 172B and a lengthwise axis E-E extending substantially parallel to the lengthwise axis D-D. The retention member 170 has an inner surface 178A and an outer surface 178B. The inner surface 178A defines an axially extending neutral conductor through passage 176 terminating at and communicating with opposed and openings 174A, 174B.

The retention member 170 includes a top wall section 180 and an integral bottom wall section 182 joined at opposed, axially extending corners 183.

The retention member 170 is generally D-shaped in cross-section or has a generally semi-circular shape in lateral cross-section (perpendicular to the lengthwise axis D-D). The top wall section 180 has a convex, arcuate or rounded outer cross-sectional profile. In some embodiments, the arc of the top wall section 180 extends across from about 160 to 200 degrees.

Figure 10:
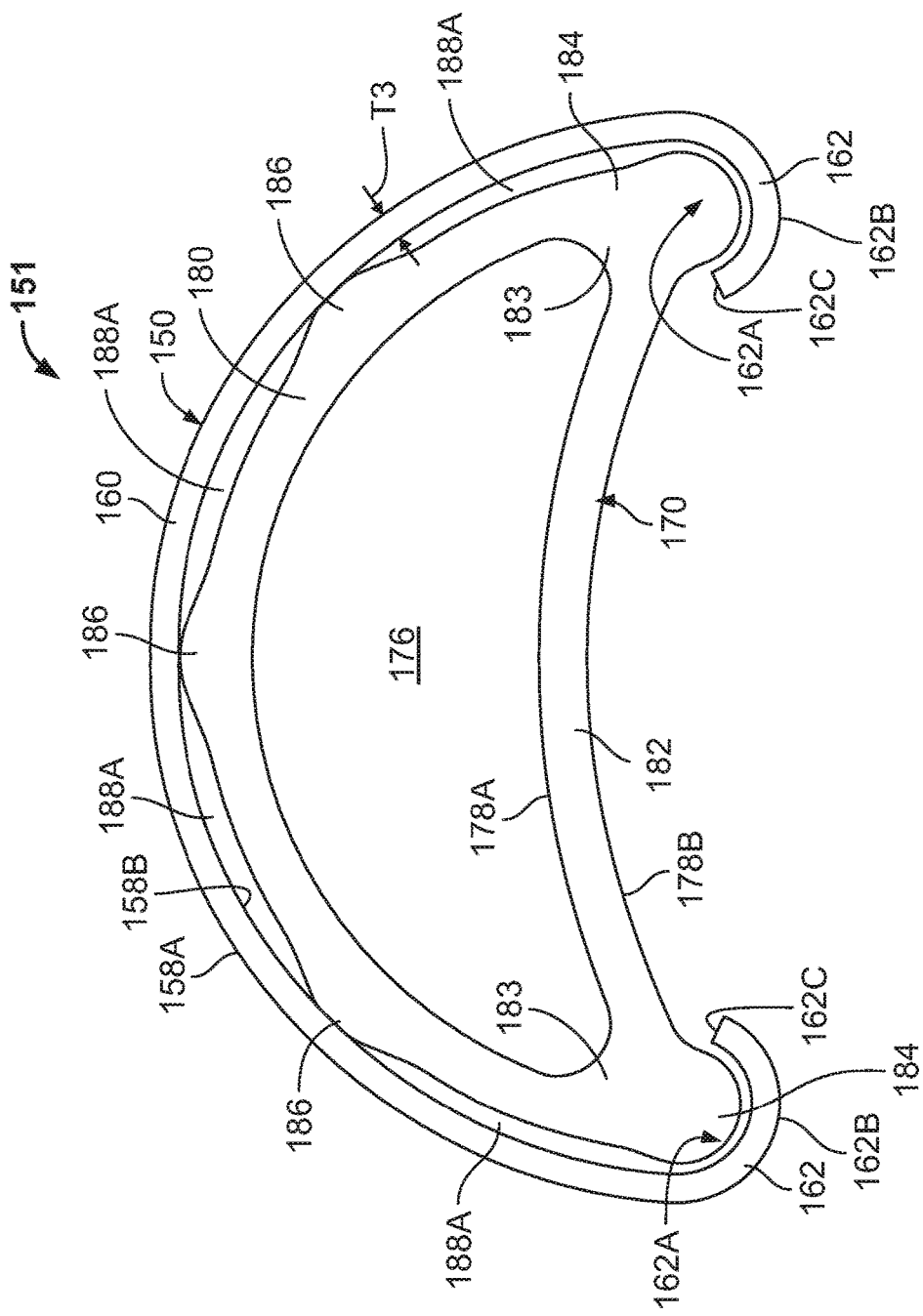
FIG. 10 is an end view of the duct assembly of FIG. 4 in the open configuration.

In some embodiments and as shown in FIG. 10, the outer surface 178B of the bottom wall section 182 also has a concave, arcuate or rounded profile in cross-section. The rounded profile of the outer surface 178B of the wall section 182 may substantially match the curvature of the layer 130. In some embodiments, the outer surface 178B of the arc of the bottom wall section 182 extends across from about 90 to 180 degrees.

Three integral, axially extending upper slide features or standoff ribs 186 project radially outwardly from the top wall section 180. Two integral, axially extending corner slide features or guide ribs 184 project outwardly from the corners 183. Vertically extending handling holes 157 are defined in the wall sections 180, 182 and intersect and communicate with the passage 176.

When the retention member 170 is mounted in the sleeve member 150, end portions of the retention member 170 as well as the upper handling hole 157 are exposed at either end of the sleeve member 150. The remainder of the retention member 170 is seated or disposed in the passage 156. The outer profile of the retention member 170 substantially fits the inner profile of the sleeve member 150. The guide ribs 184 are slidably seated in the guide grooves 162A. The standoff ribs 186 slidably engage the inner surface of the top wall section 160 at select contact points such that gaps 188A are defined between the top wall section 180 and the sleeve member 150.

The semiconductor layer 139 can be formed of any suitable electrically semiconductive material. According to some embodiments, the semiconductor layer 139 is formed of an elastically expandable material. According to some embodiments, the semiconductor layer 139 is formed of an elastomeric material. According to some embodiments, the semiconductor layer 139 is formed of carbon black and silicone. Other suitable materials may include carbon black and EPDM.

The inner sleeve 130 can be formed of any suitable material. According to some embodiments, the inner sleeve 130 is formed of a dielectric or electrically insulative material. According to some embodiments, the inner sleeve 130 is formed of an elastically expandable material. According to some embodiments, the inner sleeve 130 is formed of an elastomeric material. According to some embodiments, the inner sleeve 130 is formed of liquid silicone rubber (LSR). Other suitable materials may include EPDM or ethylene propylene rubber (EPR). According to some embodiments, the inner sleeve 130 has a Modulus at 100 percent elongation (M100) in the range of from about 0.4 to 0.52 MPa.

According to some embodiments, the thickness T1 (FIG. 3) of the inner sleeve 130 is in the range from about 0.07 to 2 inches. According to some embodiments, the length L1 (FIG. 2) of the inner sleeve 130 is in the range from about 8 to 30 inches.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness T2 (FIG. 3) of the outer sleeve 140 is in the range of from about 0.11 to 0.25 inch. According to some embodiments, the length L2 (FIG. 13) of the outer sleeve 140 is in the range of from about 15 to 35 inches. According to some embodiments, the length L3 (FIG. 2) of each outer section 149 of the outer sleeve 140 is in the range of from about 10 to 25 percent greater than the length L2.

According to some embodiments, in the open configuration the duct sleeve member 150 has a width W1 (FIG. 3) in the range of from about 1 to 2 inches. According to some embodiments, in the open configuration the sleeve member 150 has a height of H1 (FIG. 3) in the range of from about 0.5 to 1.25 inches. According to some embodiments, the length of the duct sleeve member 150 is in the range of from about 0 to 1 inch greater than the length L1 of the inner sleeve 130.

According to some embodiments, when the duct sleeve member 150 is in the collapsed configuration (FIG. 4), the sleeve member 150 has a width W2 (FIG. 4) in the range of from about 1 to 3 inches. According to some embodiments, when the sleeve member 150 is in the collapsed configuration, the sleeve member 150 has a height 112 (FIG. 4) in the range of from about 0.125 to 0.5 inch.

The sleeve member 150 and the retention member 170 of the duct assembly 151 can each be formed of any suitable material. According to some embodiments, the sleeve member 150 is formed of a formed of a first material, the retention member 170 is formed of a second material different than the first material, the first material is a flexible or semi-rigid material, and the second material is stiffer than the first material.

According to some embodiments, the sleeve member 150 is formed of a flexible or semi-rigid material. According to some embodiments, the sleeve member 150 is formed of a polymeric material. According to some embodiments, the sleeve member 150 is formed of metal. According to some embodiments, the sleeve member 150 is formed of a combination of materials such as metal and plastic adhered to each other.

According to some embodiments, the sleeve member 150 is formed of a material having an Elastic Modulus in the range of from about 1.0 GPa to 4.0 GPa and, in some embodiments, in the range of from about 60 GPa to 150 GPa.

According to some embodiments, the nominal thickness T3 (FIG. 10) of the main body wall 160 of the sleeve member 150 is in the range of from about 0.010 to 0.080 inch.

The sleeve member 150 may be formed by any suitable technique. According to some embodiments, the sleeve member 150 is extruded and cut to length. In some embodiments, the sleeve member 150 is a unitary, monolithic structure.

According to some embodiments, the retention member 170 is formed of a semi-rigid or rigid material. According to some embodiments, the retention member 170 is formed of a polymeric material. According to some embodiments, the retention member 170 is formed of metal or rigid plastic.

According to some embodiments, the retention member 170 is formed of a material having an Elastic Modulus in the range of from about 1.0 GPa to 4.0 GPa and, in some embodiments, in the range of from about 60 GPa to 150 GPa.

The retention member 170 may be formed by any suitable technique. According to some embodiments, the retention member 170 is molded (e.g., injection molded). In some embodiments, the retention member 170 is a unitary, monolithic structure.

According to some embodiments, the retention member 170 is formed of a material having an Elastic Modulus at least about 5 percent greater than the Elastic modulus of the sleeve member 150 and, in some embodiments, from about 5 to 150 percent greater.

The holdout 102 can be formed of any suitable material. According to some embodiments, the holdout 102 is formed of a rigid cardboard or plastic. According to some embodiments, the holdout 102 includes a strip helically wound to form a rigid cylinder as illustrated, for example. The holdout device 102 may be factory installed. In some embodiments, the cover assembly 100 may instead be pre-expanded in the field using a suitable expansion tool.

The cover assembly 100 may be formed by any suitable method and apparatus. According to some embodiments, the inner sleeve 130 is molded and the outer sleeve 140 is thereafter insert overmolded about the inner sleeve 130 with the duct assembly 151 interposed therebetween.

According to further embodiments, the inner sleeve 130 and the outer sleeve 140 are separately formed (for example, by molding or extrusion) and thereafter the outer sleeve 140 is mounted on the inner sleeve 130.

According to some embodiments, the inner sleeve 130 is unitarily molded. According to some embodiments, the outer sleeve 140 is unitarily molded. According to some embodiments, the sleeve member 150 is unitarily molded.

Alternatively, one or more of the inner sleeve 130, the outer sleeve 140 and the sleeve member 150 may be extruded. According to some embodiments, one or more of these components is unitarily extruded.

Figure 11:
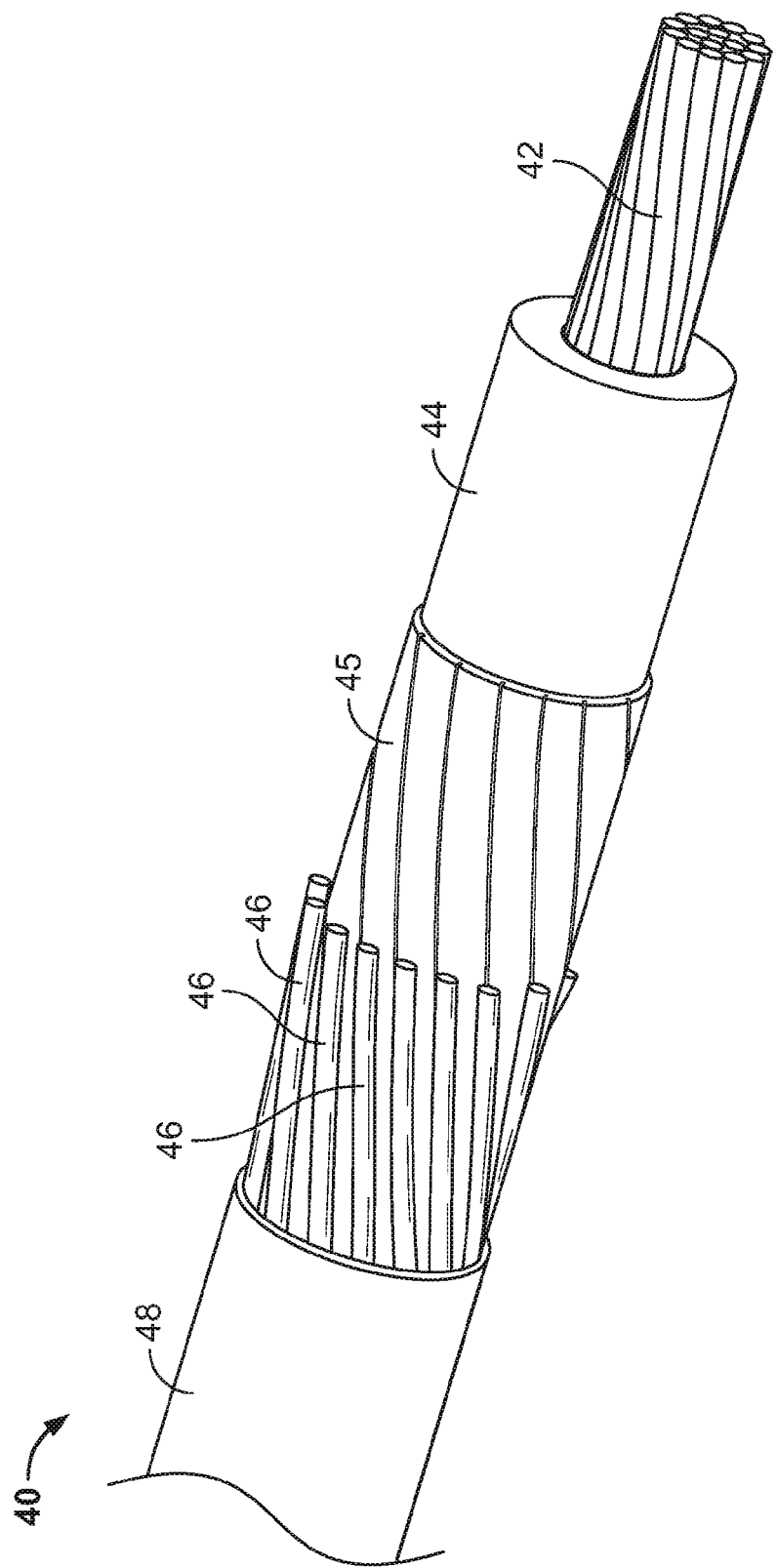
FIG. 11 is a perspective view of an exemplary concentric neutral cable.

Referring now to FIGS. 11-16, the unit 101 may be used in the following manner to apply the cover 100 over a splice connection 15 (FIG. 12) between a pair of electrical power transmission cables 40, 50 to form a connection assembly 10. According to some embodiments, the cables 40, 50 are low-voltage or medium-voltage (e.g., between about 5 and 46 kV) power transmission cables. As shown in FIG. 11, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The connection assembly 10 may be formed and the cover assembly 100 may be installed as follows. The cables 40, 50 are prepared as shown in FIG. 11 such that a segment of each layer extends beyond the next overlying layer, except that the neutral conductors 46 of the cable 40 extend at least a prescribed distance beyond the end of the primary conductor 42. This excess length of the conductors 46 can be folded back away from the terminal end of the primary conductor 42 as shown in FIG. 12.

Figure 12:
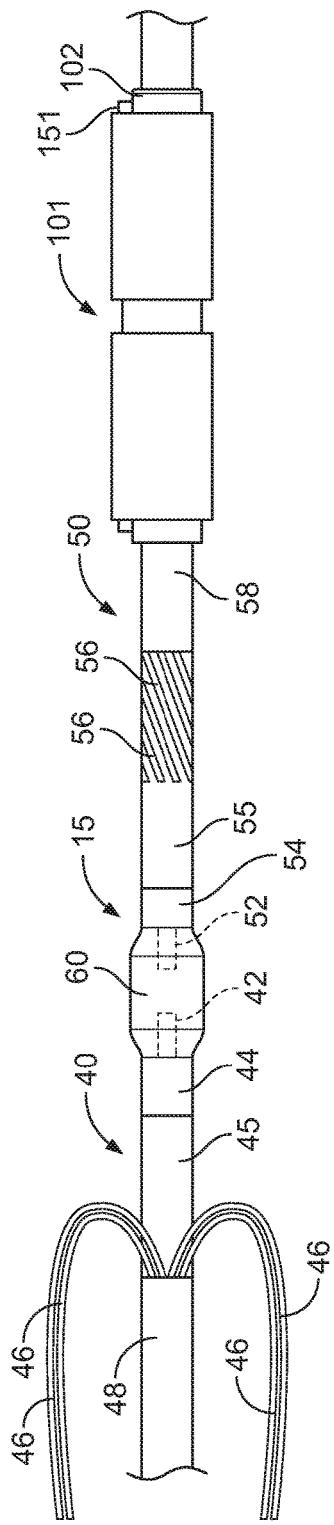

The pre-expanded unit 101 is slid over the cable 50 as shown in FIG. 12. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage 136. The pre-expanded unit 101 may be retained or parked on the cable 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG. 12. The connector 60 may be any suitable type of connector such as a metal crimp connector.

Figure 13:
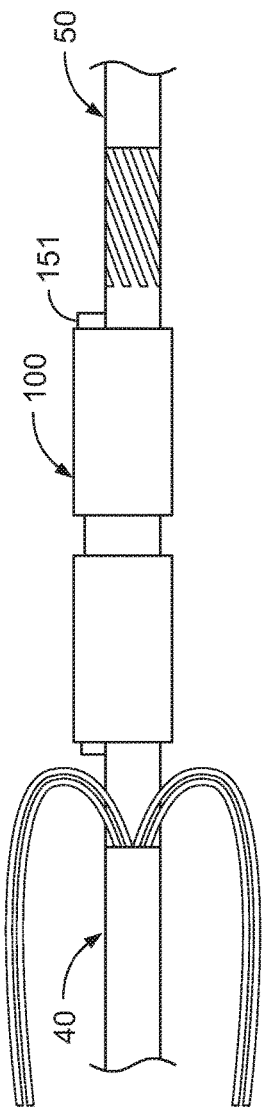

The pre-expanded unit 101 is then slid into position over the connector 60. The holdout 102 is then removed from the cover assembly 100, thereby permitting the elastomeric sleeves 130, 140 to relax and radially retract about the cables 40, 50 and the connector 60 as shown in FIG. 13. According to some embodiments, the inner sleeve 130 overlaps and engages the semiconductor layers 44, 54 of the cables 40, 50.

With the duct assembly 151 still in its open configuration as shown in FIGS. 1-3, the excess length of the neutral conductors 46 is routed or threaded through the passage 176 of the retention member 170.

The retention member 170 is then axially withdrawn from the sleeve member 150, leaving the sleeve member 150 (i.e., the remainder of the duct assembly 151) in place between the layers 130, 140. In order to withdraw the retention member 170 from the sleeve member 150, the operator may insert a finger or tool through one or both of the handling holes 157 to grasp the retention member 170 to facilitate removal. Removal of the retention member 170 is eased by the bearing ribs 186, which reduce contact surface and binding between the retention member 170 and the sleeve member 150. Removal of the retention member 170 is also eased by the arcuate, concave shape of the bottom wall 182, which may define a gap 188B (FIG. 3) with the facing surface of the semiconductor layer 139. The gap 188B can reduce friction between the retention member 170 and the semiconductor layer 139.

The neutral conductors 46 are then electrically and mechanically coupled to the neutral conductors 56 by any suitable neutral connector 62 as shown in FIG. 13. The neutral connector 62 may be any suitable connector such as a metal crimp connector. As shown in FIG. 14, the neutral conductors 46, 56 of the two cables 40, 50 may be coupled to one another on only one side of the connector 60. Alternatively, the neutral conductors 46, 56 may be coupled to one another on both sides of the connector 60.

Prior to removal of the retention member 170 from the sleeve member 150, the rigid retention member 170 radially supports the sleeve member 150 to resist or prevent the sleeve member 150 from radially collapsing under the radially compressive load of the outer sleeve 140. In this manner, the duct assembly 151 is maintained in the open configuration with the passage 176 and the enlarged passage 156 for feeding the neutral conductors 46 there through.

When the retention member 170 is removed, the retention flanges 162 are freed and the sleeve member 150 can deform. The released sleeve member 150 is forced by the recovery force load of the sleeve 140 to collapse radially inwardly and splay laterally or circumferentially to the collapsed configuration as shown in FIG. 4. The sleeve member 150 now (in the collapsed configuration) forms the duct, which is designated in the drawings as duct or collapsed sleeve member 150'. The collapsed sleeve member 150' may maintain or assume a rounded profile or shape generally matching that of the underlying sleeve 130. The flattening of the sleeve member 150 is facilitated by the rounded surfaces 162B, which enable the axially extending side edges of the sleeve member 150 to slide across the semiconductor layer 139 more easily.

Moreover, the persistent recovery force of the sleeve 140 causes the sleeve member 150' to exert a radially compressive load on the neutral conductors 46 and firmly clamp the neutral conductors 46 between the sleeve member 150' and the semiconductor layer 139. In this way, firm and reliable direct physical and electrical contact between the neutral conductors 46 and the semiconductor layer 139 is maintained. As a result, the semiconductor layer 139 is reliably grounded by the neutral conductors 46. The sleeve member 150' also holds the neutral conductors 46 together and protects the outer sleeve 140 from protruding neutral conductors 46.

Accordingly, by transitioning from the open configuration to the collapsed configuration, the radial height of the duct assembly 151 is reduced from the height H1 of the supported, expanded sleeve member 150 to the height 112 of the collapsed sleeve member 150'. In some embodiments, the cross-sectional area or volume of the passage 156 is reduced when the duct assembly 151 is transitioned from the open configuration to the collapsed configuration.

In some embodiments, the cross-sectional area of the neutral conductor passage 156 at a given location along the axis B-B of the sleeve member 150 in the collapsed configuration (FIG. 4) is less than the cross-sectional area of the passage 156 in the open configuration (FIG. 3) at the same axial location. In some embodiments, the radial height of the passage 156 at the axial location in the collapsed configuration is less than the radial height of the passage 156 at that axial location in the open configuration. The width and circumference of the sleeve member 150' at the axial location in the collapsed configuration may be greater than the width and circumference of the sleeve member 150 at the axial location in the open configuration.

Strips of sealant 64 may be applied to the outer surfaces of the cable jackets 48, 58. The operator then rolls each up the extension sections 149 of the outer sleeve 140 axially outwardly to cover the adjacent sections of the cables 40 and 50, respectively. According to some embodiments, at least a portion of each extension section 149 overlaps a respective portion of each cable jacket 48, 58 and engages the associated sealant strip 64 to provide a moisture seal. The cover assembly 100 is thereby fully installed to form the connection assembly 10 as shown in FIGS. 15 and 16.

Alternatively, the neutral conductors 46 can be routed through the duct assembly 151 before the holdout 102 has been removed and the cover assembly 100 has been initially secured about the splice connection 15.

According to further embodiments, the cover assembly 100 may include more than one duct assembly 151 and the duct assemblies may be disposed at different positions about the circumference of the cover assembly 100. In this case, the neutral conductors 46 can routed through two or more of the duct assemblies.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the cables 40, 50. The outer sleeve 140 thereby effects a liquid tight seal at the interface between the cable jackets 48, 58 and the outer sleeve 140. This seal can protect the cable and the splice from the ingress of environmental moisture. According to some embodiments the relaxed inner diameter of the inner sleeve 130 is at least 10% less than the smallest diameter cable upon which the cover assembly 100 is intended to be installed.

The adjustability of the neutral conductor passage 156 allows a single sized duct assembly 151 to accommodate a variety of cable sizes.

The reduced volume of the collapsed sleeve member 150' can provide a number of benefits. The flattened profile of the collapsed or converted sleeve member 150' creates a slimmer form for the splice, which eases the splice installation while still creating the tubular form for the neutral conductors 46 to pass through during installation.

If the retention member 170 is removed before removing the holdout 102, the force required to remove the holdout 102 is reduced as compared to a similar assembly including a rigid, non-collapsible neutral wire pass through duct.

The low profile of the collapsed sleeve member 150' reduces the expansion of the sleeve 140 by the pass through duct, thereby making the sleeve 140 less vulnerable to split or damage (in particular, local to the edges of the duct itself).

Notably, the design of the duct assembly 151 includes several features that serve to reduce the pull out force required to remove the retention member 170 and thereby convert the sleeve member 150 to its collapsed configuration. In some embodiments, the components 150, 170 are formed of materials that have a relatively low relative coefficient of friction. In some embodiments, the components 150, 170 are both formed of plastic, both formed of metal, or one is formed of plastic and the other is formed of metal. In some embodiments, the sleeve member 150 is formed of metal.

As discussed above, small bearing features in the form of ribs 186 serve to reduce the frictional contact areas between the components 150, 170.

As seen in FIG. 3, in some embodiments, the sleeve member 150 is interposed between the retention member 170 and the outer sleeve 140 so that the sleeve member 150 substantially fully separates and prevents contact between the retention member 170 and the sleeve 140. In this way, frictional resistance between the metal or plastic retention member 170 and the rubber sleeve 140 is substantially eliminated.

Also, the configuration of the duct assembly 151 reduces the contact between the retention member 170 and the sleeve 130 and/or reduces the compressive loading of the retention member 170 against the sleeve 130 so that the frictional resistance between the metal or plastic retention member 170 and the rubber sleeve 130 is substantially reduced. Notably, the retention flanges 162 of the sleeve member 150 engage the sleeve 130 and primarily bear the compressive load rather than the retention member 170. The arcuate, convex curvature of the bottom wall section 182 of the retention member 170 helps to reduce contact and pressure between the retention member 170 and the sleeve 130.

The frictional engagement between the sleeve member 150 and the sleeves 130, 140 assists in retaining the sleeve member 150 between the sleeves 130, 140 as the retention member 170 is withdrawn.

In some embodiments, the flexibility of the sleeve member 150 and the compressive load of the outer sleeve 140 serve to assist in the withdrawal of the retention member 170. As the retention member 170 is axially withdrawn, the distal end of the sleeve member 150 splays and tapers under the load of the sleeve 140 and tends to push the distal end of the retention member 170 toward the proximal end of the sleeve member 150.

Cover assemblies and methods of the present invention and as described herein can provide a number of advantages. The cover assembly 100 provides an "all-in-one" integral unit that can be installed in similar fashion to known cold shrink splice cover insulating tubes and that also accommodates the neutral conductors of concentric neutral cables. The cover assembly 100 including the inner sleeve 130, the outer sleeve 140 and the duct assembly 151 can be preassembled at a factory. Therefore, it is not necessary to provide and install a separate and supplemental re-jacketing cover to cover the neutral conductors (which must be electrically insulated from the primary conductors 42, 52 and the primary connector 60).

The cover assembly 100 can also provide advantages over known "all-in-one" integral units of the type wherein an electrically conductive mesh is incorporated into the cover assembly to engage and provide continuity between the neutral conductors (typically, copper tapes) of the concentric neutral cables. In particular, in the case of these known cover assemblies, the electrically conductive mesh may not be sufficiently conductive to provide the amount of continuity desired or required. For example, the neutral conductors of the cables being spliced may have a greater combined gauge than that of the connecting mesh. By permitting the use of the original neutral conductors of the cables 40, 50, the cover assembly 100 can ensure that the neutral conductors provided across the cover assembly 100 and the splice connection 15 are of the proper gauge. In this way, adequate continuity between the cables 40, 50 can be ensured.

The cover assemblies and methods of the present invention also permit the operator to form the connection with only a single connection (for example, crimp connection) between the neutral conductors of one cable and the neutral conductors of the other cable. Moreover, this configuration permits the operator to form the connection with a crimp on only one side of the splice.

More generally, the cover assemblies and methods of the present invention can provide improvements in ease of installation. For example, in embodiments wherein the duct member is rigid or semi-rigid, the neutral conductors can be conveniently inserted through the passage of the duct member.

While in the embodiments shown in the drawings the neutral conductors are wires, according to further embodiments the neutral conductors may take other shapes or configurations such as one or more flat tapes. In some embodiments, an elongate jumper or extension conductor is provided that is clamped or otherwise secured in electrical contact with the cable neutral conductors (e.g., flat copper tapes) on either side of the splice and is routed through the duct assembly 151 as described herein. In this case, the jumper conductor constitutes a neutral conductor and is an extension of the neutral conductor of at least one of the spliced cables. The jumper conductor may be a braided copper mesh or sock, for example.

While the duct assembly 151 as illustrated extends the full length of the inner sleeve 130, according to other embodiments, the duct extends only partially (i.e., a distance less than the full length) across the inner sleeve 130.

Cover assemblies according to some embodiments of the present invention may include additional layers and/or certain layers may be omitted. For example, cover assemblies in accordance with some embodiments of the present invention may be formed without the semiconductor layer 139. One or more additional layers may be interposed between the inner sleeve 130 and the outer sleeve 140.

Cover assemblies and ducts according to embodiments of the invention may be used for any suitable cables and connections. Such cable assemblies may be adapted for use, for example, with connections of medium voltage cables up to about 46 kV. In some applications, the cover assemblies or ducts are installed on underground residential distribution (URD) cable splices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An integral, unitary cover assembly for covering an electrical connection between first and second electrical cables each having a primary conductor and a neutral conductor, the cover assembly comprising:
   an elastomeric inner sleeve defining a cable passage to receive the electrical connection and the primary conductors of the first and second cables;
   an elastomeric outer sleeve surrounding the inner sleeve; and
   a collapsible duct assembly interposed radially between the inner and outer sleeves, the duct assembly including:
      an outer duct sleeve member defining a first passage; and
      an inner retention member disposed in the first passage, the retention member defining a second passage configured to receive at least one of the neutral conductors therethrough;
   wherein:
      the duct sleeve member is flexible;
      the retention member maintains the duct sleeve member in an open configuration when the retention member is disposed in the first passage; and
      the duct sleeve member is selectively collapsible about the at least one neutral conductor from the open configuration to a collapsed configuration by withdrawing the retention member from the first passage.

2. The cover assembly of claim 1 wherein the retention member is tubular.

3. The cover assembly of claim 1 wherein the retention member includes a substantially concave bottom wall facing the inner sleeve.

4. The cover assembly of claim 1 wherein the retention member includes a substantially convex top wall facing the outer sleeve and maintaining the duct sleeve member with a substantially convex outer profile when the retention member is disposed in the first passage.

5. The cover assembly of claim 1 wherein the duct sleeve member includes an axially extending side opening communicating with first passage and facing the inner sleeve.

6. The cover assembly of claim 1 wherein the duct sleeve member substantially fully separates the retention member from the outer sleeve.

7. The cover assembly of claim 1 wherein:
   the duct sleeve member includes a pair of opposed, axially extending retention grooves; and
   the retention member includes a pair of opposed, axially extending guide ribs each slidably seated in a respective one of the retention grooves.

8. The cover assembly of claim 1 wherein the retention member includes at least one friction reducing bearing rib to slidably contact an inner surface of the duct sleeve member when the retention member is disposed in the duct sleeve member.

9. The cover assembly of claim 1 wherein the retention member includes a handling hole defined therein and configured to be engaged by an operator to facilitate withdrawal of the retention member from the first passage.

10. The cover assembly of claim 1 wherein the duct sleeve member and the retention member are each formed of plastic and/or metal.

11. The cover assembly of claim 1 wherein:
the duct sleeve member is formed of a material having an Elastic Modulus in the range of from about 1 to 60 GPa; and
the retention member is formed of a material having an Elastic Modulus in the range of from about 1 to 150 GPa.

12. The cover assembly of claim 1 wherein a height of the first passage at an axial location in the collapsed configuration is greater than a height of the first passage at the axial location in the open configuration.

13. The cover assembly of claim 1 configured such that, when the at least one neutral conductor extends through the first passage and the duct sleeve member is in the collapsed configuration:
the duct sleeve member is radially compressively loaded against the at least one neutral conductor; and
the at least one neutral conductor is loaded in direct contact with the inner sleeve.

14. The cover assembly of claim 13 configured such that, when the at least one neutral conductor extends through the first passage and the duct sleeve member is in the collapsed configuration, the duct sleeve member is radially compressively loaded against the at least one neutral conductor by a recovery force of the outer elastomeric sleeve.

15. The cover assembly of claim 1 wherein the cover assembly extends along a lengthwise axis from a cover first end to a cover second end, and the inner sleeve, the outer sleeve and the duct assembly each extend lengthwise and have a respective first end proximate the cover first end and a respective second end proximate the cover second end.

16. The cover assembly of claim 1 wherein:
the outer sleeve is formed of ethylene propylene diene monomer (EPDM) rubber;
the inner sleeve is formed of silicone rubber;
the cover assembly includes a Faraday cage sleeve mounted within the inner sleeve and formed of an electrically conductive elastomer;
the cover assembly includes a stress cone sleeve mounted within the inner sleeve proximate an end thereof, wherein the stress cone sleeve is formed of an electrically conductive elastomer; and
the cover assembly includes a semiconductor layer mounted on an outer side of the inner sleeve.

17. The cover assembly of claim 1 further including a removable holdout device mounted within the inner sleeve, wherein the holdout device is operative to temporarily maintain the inner sleeve and the outer sleeve in an expanded state.

18. The cover assembly of claim 1 wherein the cover assembly is a cold shrinkable cover assembly.

19. A method for forming a connection assembly, the method comprising:
forming an electrical connection between first and second electrical cables, the first and second cables each including a primary conductor and at least one neutral conductor;
providing an integral, unitary cover assembly including:
an inner elastomeric sleeve defining a cable passage;
an outer elastomeric sleeve surrounding the inner sleeve; and
a collapsible duct assembly interposed radially between the inner and outer sleeves, the duct assembly including:
an outer duct sleeve member defining a first passage; and
an inner retention member disposed in the first passage, the retention member defining a second passage configured to receive at least one of the neutral conductors therethrough;
wherein:
the duct sleeve member is flexible;
the retention member maintains the duct sleeve member in an open configuration when the retention member is disposed in the first passage; and
the duct sleeve member is selectively collapsible about the at least one neutral conductor from the open configuration to a collapsed configuration by withdrawing the retention member from the first passage;
mounting the cover assembly on the cables such that the electrical connection and the primary conductors of the first and second cables extend through the cable passage;
with the duct sleeve member in the open configuration, inserting the at least one neutral conductor of the first cable through the second passage of the retention member;
with the at least one neutral conductor disposed in the second passage, withdrawing the retention member from the first passage to collapse the duct sleeve member from the open position to the collapsed position; and
coupling the at least one neutral conductor of the first cable with the at least one neutral conductor of the second cable.

20. A method for forming an integral, unitary cover assembly for covering an electrical connection between first and second electrical cables each having a primary conductor and a neutral conductor, the method comprising:
forming an inner elastomeric sleeve defining a cable passage to receive the electrical connection and the primary conductors of the first and second cables;
forming an outer elastomeric sleeve surrounding the inner sleeve; and
interposing a collapsible duct assembly radially between the inner and outer sleeves, the duct assembly including:
an outer duct sleeve member defining a first passage; and
an inner retention member disposed in the first passage, the retention member defining a second passage configured to receive at least one of the neutral conductors therethrough;
wherein:
the duct sleeve member is flexible;
the retention member maintains the duct sleeve member in an open configuration when the retention member is disposed in the first passage; and
the duct sleeve member is selectively collapsible about the at least one neutral conductor from the open configuration to a collapsed configuration by withdrawing the retention member from the first passage.

* * * * *

UNITED STATES PATENT AND TRADEMARK OFFICE
CERTIFICATE OF CORRECTION

Page 1 of 1

PATENT NO. : 10,074,965 B2
APPLICATION NO. : 15/142759
DATED : September 11, 2018
INVENTOR(S) : Edward O'Sullivan It is certified that error appears in the above-identified patent and that said Letters Patent is hereby corrected as shown below:

In the Specification

Column 11, Line 7: Please correct "112" to read -- H2 --

Signed and Sealed this
Eleventh Day of December, 2018

Andrei Iancu
*Director of the United States Patent and Trademark Office*